United States Patent
Clauss (10) Patent No.: US 12,246,966 B2
(45) Date of Patent: Mar. 11, 2025

(54) LOW POROSITY, FUNCTIONALIZED, CARBON MICRO-POWDERS

(71) Applicant: CTI Consulting, LLC, Madison, WI (US)

(72) Inventor: Allen D. Clauss, Madison, WI (US)

(73) Assignee: CTI Consulting, LLC, Madison, WI (US)

( * ) Notice: Subject to any disclaimer, the term of this patent is extended or adjusted under 35 U.S.C. 154(b) by 543 days.

(21) Appl. No.: 17/636,693

(22) PCT Filed: Aug. 19, 2020

(86) PCT No.: PCT/US2020/046933
§ 371 (c)(1),
(2) Date: Feb. 18, 2022

(87) PCT Pub. No.: WO2021/034900
PCT Pub. Date: Feb. 25, 2021

(65) Prior Publication Data
US 2022/0324711 A1  Oct. 13, 2022

Related U.S. Application Data (60) Provisional application No. 62/889,261, filed on Aug. 20, 2019.

(51) Int. Cl.
*C01B 32/05* (2017.01)
*C08K 3/04* (2006.01)

(52) U.S. Cl.
CPC ............... *C01B 32/05* (2017.08); *C08K 3/04* (2013.01); *C01P 2002/70* (2013.01); *C01P 2004/61* (2013.01); *C01P 2006/12* (2013.01)

(58) Field of Classification Search
CPC ........... C01B 32/05; C01B 32/00; C08K 3/04; C01P 2002/70; C01P 2004/61; C01P 2006/12; C01P 2002/72; C01P 2004/03; C01P 2004/20; C09C 1/44; C09C 1/46; C09C 1/48
See application file for complete search history.

(56) References Cited

U.S. PATENT DOCUMENTS

| | | | |
|---|---|---|---|
| 2011/0189452 A1* | 8/2011 | Lettow | C01B 32/225 977/734 |
| 2013/0252082 A1 | 9/2013 | Thompkins et al. | |
| 2014/0227165 A1* | 8/2014 | Hung | B82Y 40/00 422/198 |
| 2014/0227211 A1 | 8/2014 | Shankman | |
| 2016/0152748 A1 | 6/2016 | Goffredi et al. | |
| 2017/0033360 A1 | 2/2017 | Michaud et al. | |
| 2017/0206997 A1 | 7/2017 | Al-Harthi et al. | |

(Continued)

OTHER PUBLICATIONS

Lee, et al., X-ray diffraction analysis of the effect of ball milling time on crystallinity of milled polyacrylonitrile-based carbon fiber, Carbon Letters 2018; 26: 11-17 (Year: 2018).*

(Continued)

*Primary Examiner* — Daniel C. McCracken
(74) *Attorney, Agent, or Firm* — Casimir Jones, S.C.; J. Mitchell Jones (57) ABSTRACT

The present invention includes novel, low porosity, functionalized carbon micro-powders derived from natural sugars and methods for producing them.

8 Claims, 7 Drawing Sheets

(56) References Cited

U.S. PATENT DOCUMENTS

2019/0144280 A1* 5/2019 Opoku ............... C01B 32/15
423/461

OTHER PUBLICATIONS

Roesky Herbert W. "Sugar cola by splitting off water from sugar with sulfuric acid" In: "Spectacular Chemical Experiments", Jan. 1, 2018, pp. 17-19.

Supplementary European Search Report, EP Application No. 20855499.8, dated Oct. 31, 2023, 8 pages.

International Search Report and Written Opinion for PCT/US2020/046933. Mailed Nov. 19, 2020. 10 pages.

"Carbon Additives for Polymer Compounds", Technical Bulletin, Timcal Graphite and Carbon, Timcal Ltd. Retrieved from the internet Aug. 17, 2022. 48 pages.

"Carbon Black", Wikipedia. Retrieved from the internet Aug. 17, 2022. 7 pages.

"Carbon Powders for Lithium-Ion Battery Systems" Technical Bulletin, TImcal Graphite and Carbon, Timcal Ltd. Retrieved from the internet Aug. 17, 2022. 16 pages.

"Graphite" Wikipedia. Retrieved from the internet Aug. 17, 2022. 20 pages.

Fechler et al., Salt and Sugar: Direct Synthesis of High Surface Area Carbon Materials at Low Temperatures via Hydrothermal Carbonization of Glucose under Hypersaline Conditions. J. Mater. Chem. A, 2013, 1, 9418-9421.

Harmas et al., Carbon for Energy Storage Derived from Granulated White Sugar by Hydrothermal Carbonization and Subsequent Zinc Chloride Activation. J. Electrochem. Soc., 2017, 164, A1866-A1872.

Harris et al., Imaging the Atomic Structure of Activated Carbon. J. Phys.: Condens. Matter, 2008, 20, 362201, 12 pages.

Harris. New Perspectives on the Structure of Graphitic Carbons. Critical Reviews in Solid State and Materials Sciences, 2005, 30(4), 235-253.

Juri et al., "High Purity Graphite Powders for High Performance", Technical Bulletin, Timcal Graphite and Carbon, Timcal Ltd. Retrieved from the internet Aug. 17, 2022. 7 pages.

Li et al., Pentagonal puckering in a sheet of amorphous graphene. Phys. Status Solidi B, 2011. 9, 2082-2086.

Liao et al., Does Graphene Change Tg of Nanocomposites? Macromolecules, 2014. 47, 8311-8319.

Manocha. Porous Carbons. Sadhana: Academy Proceedings in Engineering and Sciences. 2003. 28(1):335-348.

Marriott et al., Investigating the structure of biomass-derived non-graphitizing mesoporous carbons by electron energy loss spectroscopy in the transmission electron microscope and X-ray photoelectron spectroscopy. Carbon, 2014, 67:514-524.

Morimoto et al., Tailoring the Oxygen Content of Graphite and Reduced Graphene Oxide for Specific Applications. Scientific Reports, 2016, 6: 21715, 1-8.

Park et al., Electrical and thermal conductivities of reduced graphene oxide/polystyrene composites. Appl. Phys. Lett. 2014, 104:113101. 1-13.

Smith et al., A simple model describes the PDF of a non-graphitizing carbon. Carbon, 2004, 42:10, 2041-2048.

Whitener. Rapid synthesis of thin amorphous carbon films by sugar dehydration and dispersion. AIMS Material Science. 2016, 3(4), 1309-1320.

Yu et al., Ordered uniform porous carbon by carbonization of sugars. Carbon. 2001. 39(9), 1442-1446.

Zhou et al., Use of graphene oxide in achieving high overall thermal properties of polymer for printed electronics. RSC Adv., 2016, 6, 20621, 29 pages.

* cited by examiner

LOW POROSITY, FUNCTIONALIZED, CARBON MICRO-POWDERS

FIELD OF THE INVENTION

The present invention includes novel, low porosity, functionalized carbon micro-powders derived from natural sugars and methods for producing them.

BACKGROUND OF THE INVENTION

Graphite, carbon black, and activated carbon micro- and nano-powders are useful in a wide range of applications including battery and ultracapacitor electrodes, and as functional fillers in polymers to provide enhanced mechanical properties, thermal stability, barrier properties, electrical conductivity and thermal conductivity. However, as functional fillers in polymers, all of these carbon powders have structural characteristics that result in significant performance trade-offs or limitations in many of the most desirable performance attributes.

For example, the graphites [1-2], with a planar structure based on the graphene substructure, are available as high aspect ratio platelets which exhibit very high modulus and high electrical and thermal conductivity, however, the planar structure of graphite, consisting of stacked slip-planes of graphene, generally results in agglomeration and poor dispersion of graphite powders in polymer matrices resulting in structural defects and compromised mechanical properties due to the irregular and relatively unstable polymer graphite interfaces. In applications where mechanical properties are less important, such as thermal conductivity, graphite powders do not allow for enhancement of thermal conductivity without simultaneous enhancement of electrical conductivity which is undesirable for many thermal interface applications in electronics where the thermal interface material needs to be electrically insulating.

Carbon black micro- and nano-powders [3-5] most commonly consist of primary particles that are spherical, not planar platelets as with graphite. Spherical particles are inherently less efficient as functional fillers compared to high aspect ratio particles such as platelets or needles and these spherical particles also have a high tendency to agglomerate into complex clusters which also limit dispersion in polymer matrices resulting in defects and irregular and unstable interfaces which compromise mechanical properties. Carbon black powders are also subject to the limitation of not allowing independent enhancement of thermal vs electrical conductivity.

Activated carbon powders, typically derived from cellulosic starting materials [6], generally consist of highly porous particles that can have a wide range of shapes and pore sizes. These materials are classified according to pore size ranges, as macroporous (pores greater than 50 nm in diameter), mesoporous (pores ranging from 2 to 50 nm in diameter), and microporous (pores less than 2 nm in diameter). They have high surface areas and high void volumes, and they are consequently very useful in filtration and adsorption applications, but not generally useful as functional fillers in polymers due to their poor structural integrity, highly irregular shapes and poor interfacial compatibility with polymers.

In contrast with graphite which is a 2-D layered planar structure and is predominantly crystalline, carbon blacks and activated carbons have complex 3-D structures and are predominantly amorphous. Until recently, the bonding of the carbon atoms and detailed structure of these materials were not well understood, but it is now well established that the curvature, porosity and 3-D structure of these materials results from the presence of some 5 and 7-membered aromatic rings as opposed to all 6-membered aromatic rings present in graphite [7-11]. They are structurally related to the fullerenes which have closed spherical and ellipsoid structures due to the presence of alternating 5 and 6 membered rings.

SUMMARY OF THE INVENTION

The present invention includes novel, low porosity, functionalized carbon micro-powders derived from natural sugars and methods for producing them.

Accordingly, in some embodiments, the present invention provides an oxygen functionalized carbon micro-powder characterized in having one or more of the following properties: a) a carbon content of from 65 to 95% and an oxygen content of 35 to 5% on a weight basis; b) a specific surface area of less than 500 $m^2/g$ (BET method); c) percent crystallinity of 5% to 75% (XRD method); d) the particles have a platelet morphology with aspect ratios greater than 5:1; e) the particles have significant curvature such that they are not planar; and f) the particles have a smooth, non-porous appearance at 1,000× magnification by SEM. In some preferred embodiments, the powder has two or more properties a)-f). In some preferred embodiments, the powder has three or more properties a)-f). In some preferred embodiments, the powder has four or more properties a)-f). In some preferred embodiments, the powder has five or more properties a)-f). In some preferred embodiments, the powder has properties a)-f).

In some preferred embodiments, the present invention provides an oxygen functionalized carbon micro-powder produced by dehydration of a naturally occurring sugar by a process comprising the following steps: a) mixing the sugar with concentrated strong acid to effect partial dehydration to a predominantly carbon material; b) rinsing the carbon material with water to remove the acid; c) drying the material to remove free water; and d) grinding or milling the carbon material to obtain a micro-powder. In other preferred embodiments, the present invention provides a process for making an oxygen functionalized carbon micro-powder comprising steps a) to d).

In some preferred embodiments, the sugar is a naturally occurring hexose. In some preferred embodiments, the hexose is selected from the group consisting of fructose, glucose, and galactose. In some preferred embodiments, the sugar is a naturally occurring disaccharide. In some preferred embodiments, the disaccharide is selected from the group consisting of sucrose and lactose. In some preferred embodiments, the concentrated acid is selected from the group consisting of concentrated sulfuric and phosphoric acid. In some preferred embodiments, the sugar is a crystalline sugar. In some preferred embodiments, the sugar crystals are larger than 100 microns in their smallest dimension. In some preferred embodiments, the process includes an additional step of heating the micro-powder to a temperature above 100° C. to reduce the oxygen content. In some preferred embodiments, the carbon micro-powder has an oxygen content of 5% to 35%. In some preferred embodiments, the carbon micro-powder has a % crystallinity from 5% to 75% (XRD method) and/or optionally one, two, three, four or five of properties (a) to (e) listed above.

In some preferred embodiments, the present invention provides a polymer composite comprising one or more of the carbon micro-powders as described above and a thermosetting or thermoplastic polymer. In some preferred embodiments, the composite comprises from 1% to 60% carbon micro-powder. In some preferred embodiments, the thermosetting resin is an epoxy resin, an unsaturated polyester resin, a polyurethane resin, a cyanoacrylate resin or a silicone resin. In some preferred embodiments, the thermosetting polymer is initially a liquid resin and the carbon micro-powder is dispersed into the liquid resin prior to curing (hardening) the resin. In some preferred embodiments, the thermoplastic polymer is polyethylene, polypropylene, poly(vinyl chloride), poly(ethylene terephthalate) polycarbonate, polystyrene, polyamide, poly(methylmethacrylate) or polyacrylonitrile. In some preferred embodiments, the bulk thermal conductivity of the composite is greater than 0.27 W/m-K, and the electrical resistivity of the composite is greater than 1.0E10 Ohm-cm.

DETAILED DESCRIPTION OF THE INVENTION

A limitation shared by all of the previously known types of carbon powders discussed above is that their hydrophobic nature results in poor interfacial bonding with many polymers (e.g. epoxy resins, unsaturated polyester resins, polyamides, polyesters, poly(vinyl chloride), etc.) resulting a relatively high energy, unstable interface between the carbon particles and the polymers. In order to form highly stable composites with these more polar polymers and achieve optimum performance properties, it is desirable to have carbon particles that are functionalized to some degree on the outer surface with polar oxygen-containing functional groups. One approach that has been used with graphite to introduce oxygen functionalization is to treat the graphite with strong oxidizing agents (thereby converting it to graphite oxide) followed by partial reduction to achieve a desired degree of oxygen functionalization [15-17]. However, such treatment is complex, costly, and generally results in significant losses in most desirable performance attributes (e.g. strength, modulus, electrical conductivity, thermal conductivity) compared to graphite. Numerous other methods have been disclosed for functionalizing the surface of carbon powders, but they generally suffer limitations of complexity, high cost, and/or loss of performance properties.

The present invention includes novel, low porosity, functionalized carbon micro-powders derived from natural sugars and methods for producing them. Being derived from natural renewable plant-based sugars, these carbon powders have an inherent environmental sustainability advantage versus carbon black powders and synthetic graphites which derive from non-renewable resources. There are relatively few published examples of well characterized carbon powder materials derived from natural sugars and those that have been reported, unlike the carbon powders of the present invention, are highly porous materials more closely related to known activated carbon powders derived from cellulosic starting materials [12-14]. In a related, but distinctly different development reported by Whitener [15] amorphous carbon films were produced by dehydration of glucose with concentrated sulfuric acid to obtain carbonaceous suspensions that when added dropwise to water, form carbon films of nano-scale thickness at the surface of the water.

The carbon micro-powders of the present invention exhibit a unique combination of structural and performance attributes not exhibited by previously known carbon powders. They exhibit a significant degree of crystallinity, hardness, and structural integrity with very low porosity. The particles are non-planar platelets with a low degree of random curvature that inhibits agglomeration or "stacking" of platelets that occurs with planar platelets such as graphite. The degree of oxygen functionalization can be readily controlled by simply heating the powders in a temperature range from about 100° C. to 600° C., allowing oxygen content to be varied from ca 35% by weight to less than 5% by weight, thereby allowing the surface polarity of the powders to be tuned to the polarity of host polymers for optimum stability and performance properties of the resulting composites.

The powders of the present invention are derived from natural sugars by a simple, one-step dehydration reaction, followed by rinsing, filtration and drying steps, allowing them to be produced on a large scale at low cost. Preferred starting materials are common crystalline hexose sugars including, fructose, glucose, galactose, and crystalline disaccharides, sucrose and lactose. The present invention discloses novel carbon micro-powders, methods for producing them, and examples of useful applications for these materials, particularly as functional fillers for thermosetting and thermoplastic polymers to provide enhanced thermal stability, thermal conductivity, and mechanical properties.

The crystalline hexose sugars and disaccharides, useful as starting materials in the present invention, exist as cyclic hemiacetal or hemiketal, five (furanose) or six (pyranose) membered ring structures in their crystalline states. These crystalline sugars rapidly dehydrate when treated with concentrated acids resulting in formation of a black, predominantly carbon material with a layered ash-like macro structure containing very large pores and voids in the millimeter to centimeter size range due to escaping steam as the carbon solid formed during the dehydration reaction. The resulting carbon material is easily crushed into a flakey solid that is rinsed repeatedly with distilled water and filtered to remove the acid, after which it is washed with an organic solvent (e.g. acetone) to remove soluble organic impurities. After air drying, the resultant carbon material is crushed to a coarse powder followed by grinding to a fine powder. The grinding can be effectively carried out on a small scale with a mortar and pestle, or on a larger scale with various types of mills (e.g. ball mill, hammer mill, etc.). The resultant carbon micro-powder is then screened using micro screen sieves to isolate desired particle size ranges (e.g. <50 microns, 50-150 microns, etc.) for specific applications.

In contrast with known activated carbon powders or carbon black powders which are predominantly amorphous, have highly porous or complex and irregular morphologies and surface areas generally greater than 500 m²/g, the primary particles of the carbon powders of the present invention have smooth non-porous surfaces, consistent platelet morphology, a low but significant degree of random curvature, and surface areas (BET method) less than 500 m²/g.

The micro-powders afforded by the present invention are useful as functional fillers in thermosetting and thermoplastic polymers to produce polymer composites with enhanced performance properties. They are readily dispersible in a wide range of polymers, and the particle size and degree of oxygen functionalization can be varied over a wide range to optimize the powders to provide different specific mechanical, electrical, thermal, and other performance attributes beyond those exhibited by polymers without filler. For example, micro-powders of the current invention comprising about 30% oxygen functionalization are readily dispersible in epoxy resins at loading levels from 5% to 60% by weight, which after curing, show a significant increase in modulus at room temperature and superior retention of modulus at elevated temperatures. Consistent with the improvement in retention of modulus at elevated temperatures, epoxy composites of the present invention show significantly higher glass transition temperatures versus the corresponding cured epoxies without the carbon micro-powders. The increase in glass transition temperatures are indicative of a favorable bonding interaction between the polymer chains and the carbon particles resulting in an unusually stable interface.

Other important performance attributes of thermosetting and thermoplastic polymers that can be improved with the carbon micro-powders of the current invention include, but are not limited to, tensile strength, compression strength, dimensional stability, and flame retardancy.

The technology is not limited in the resin that is used to make the polymer-micro carbon powder composite materials. In some embodiments, the polymer is a thermoplastic polymer, a thermoset polymer, and/or an elastomer polymer. In some embodiments, the polymer is a liquid thermoset polymer. In some embodiments, the polymer is an unsaturated polyester polymer. In some embodiments, the polymer is an epoxy polymer. In some embodiments, the polymer is a vinyl ester polymer. In some embodiments, the polymer is a thermoset polyurethane polymer. In some embodiments, the polymer is an alkyl cyanoacrylate polymer. In some embodiments, the polymer is a propylene polymer. In some embodiments, the polymer is an ester polymer, an amide polymer, a styrene polymer, a vinyl polymer (e.g., a vinyl chloride polymer), an imide polymer, a dimethylsiloxane polymer, an olefin polymer, a carbonate polymer, a nitrile rubber polymer, a styrene-co-acrylic acid polymer, a urethane polymer, a silicone polymer, an ethylene-co-vinyl acetate polymer, a methylmethacrylate polymer, a butyl rubber polymer, an acrylic rubber polymer, an N-vinyl pyrrolidone polymer, an ethylene oxide polymer, an ethylene-propylene-diene monomer polymer, a styrene butadiene rubber polymer, an ethylene-co-octene polymer, a halobutyl rubber polymer, a silylated-sulfonated ether ketone polymer, a benzimidizole polymer, a fluorinated benzimidizole polymer, a sulfonated styrene ethylene butylene styrene polymer, a hydroxylated monomer polymer, a hyperbranched monomer polymer, a sulfonated ether ketone polymer, a sulfonated benzimidazole copolymer polymer, a phosphoric acid doped benzimidazole polymer, a sulfonated aryl-enethioether-sulfone polymer, a sulfonated benzimidazole polymer, a phenylene-vinylene polymer, a thiopene polymer, a fluorene polymer, an aniline polymer, a pyrrole polymer, an amidoamine dendrimer polymer, an acrylamide polymer, a vinyl ester polymer, an unsaturated ester polymer, or a styrene butadiene polymer. In addition, the technology finds use with monomers such as amino acids, sugars, and nucleotides (deoxynucleotides and ribodeoxynucleotides).

Accordingly, in some embodiments, the technology produces a polymer comprising the carbon micro-powder in a thermoplastic, a thermoset, and/or an elastomer polymer. Furthermore, in some embodiments, the polymer comprising the carbon micro-powder is an unsaturated polyester polymer. In some embodiments, the polymer comprising the carbon micro-powder is an epoxy polymer. In some embodiments, the polymer comprising the carbon micro-powder is a polypropylene. In some embodiments, the polymer comprising the carbon micro-powder is a polyester, a polyamide, a polystyrene, a polyvinyl (e.g., a polyvinyl chloride), a polyimide, a polydimethylsiloxane, a polyolefin, a polycarbonate, a nitrile rubber, a poly(styrene-co-acrylic acid), a polyurethane, a silicone, a poly(ethylene-co-vinyl acetate), a poly(methylmethacrylate), a butyl rubber, an acrylic rubber, a poly(N-vinyl pyrrolidone), a poly(ethylene oxide), an ethylene-propylene-diene monomer rubber, natural rubber, styrene butadiene rubber, poly(ethylene-co-octene), halobutyl rubber, silylated-sulfonated poly(ether ketone), poly(benzimidizole), fluorinated poly(benzimidizole), sulfonated polystyrene ethylene butylene polystyrene, hydroxylated polymers, hyperbranched polymers, cross linked sulfonated poly(ether ketone), sulfonated polybenzimidazole copolymer, phosphoric acid doped polybenzimidazole, sulfonated polyaryl-enethioether-sulfone, sulfonated polybenzimidazole, poly(phenylene-vinylene), polythiopene, polyfluorene, polyaniline, polypyrrole, polyamidoamine dendrimer, polyacrylamide, a vinyl ester, an unsaturated polyester, or a polystyrene butadiene. In addition, the technology finds use with biomolecules such as proteins, DNA, RNA, lipids, sugars, and crystalline cellulose.

Epoxy resin composites containing carbon micro-powders of the present invention with high oxygen content (e.g. 30%) as described above show very little enhancement in either electrical or thermal conductivity compared to epoxy resin with no filler; however, similar epoxy resin composites containing carbon micro-powders of the present invention with lower oxygen content (e.g. <25%) show enhanced thermal conductivity with negligible enhancement of electrical conductivity. This result is surprising and in contrast with known carbon micro- and nano-powders that generally show a strong correlation between electrical conductivity and thermal conductivity preventing significant enhancement of one property without simultaneous enhancement of the other. Consequently, known carbon powder fillers are generally not useful as thermal interface materials for electronics applications that require high thermal conductivity, but very low electrical conductivity, whereas low oxygen content carbon powders of the present invention are useful for these applications.

The carbon powders of the present invention with significantly lower oxygen content (e.g. <25%) are produced by heat activation of the higher oxygen content powders. For example, heating the high oxygen content powders briefly (ca 15 min in air) to 500° C. results in powders with less than 25% oxygen content. More extensive heating under inert atmosphere affords powders with a range of oxygen content from 25% to less than 5%.

Without being bound by theory, it appears that the surface functionalization of the powders of the present invention results in favorable interfacial interactions with relatively polar polymers such as epoxy resins or polyamide resins with related increases in modulus, thermal stability and Tg, but if the oxygen functionalization is too high, (e.g. >25%) the oxygen groups reduce the structural order and crystallinity of the carbon framework (see XRD analysis results in examples below) and inhibit transfer of vibrational phonons resulting in very low thermal conductivity compared to, for example, unfunctionalized graphite. Such differences in crystallinity are known to correlate with thermal conductivity, but not necessarily with electrical conductivity, as amorphous carbon powders can be highly electrically conductive in polymer composites at very low loadings compared to crystalline graphite powders. Consequently, when the surface oxygen content of the carbon powders of the present invention is lowered sufficiently (e.g. <25%) to allow for more efficient transfer of vibrational phonons, a uniquely high ratio of thermal conductivity to electrical conductivity (compared to previously known carbon powders) is observed.

Studies of the electrical and thermal conductivities of partially reduced graphite oxide [15-17] provide evidence that these properties are strongly influenced by oxygen content and can be to some extent "tuned" by varying the oxygen content; however, the required oxidation and reduction reactions are much more complex and costly than the simple dehydration reactions employed in the present invention, and it has not been demonstrated that large increases in thermal conductivity of graphite oxide can be achieve without corresponding increases in electrical conductivity.

EXAMPLES

Preparation of Functionalized Carbon Material from Crystalline Fructose. To crystalline fructose (30.107 g, 0.167 mole) was added concentrated sulfuric acid (38.0 mL, 0.699 mole) in a 150 mL beaker. The mixture was stirred with a glass stirring rod for ca 90 seconds resulting in the crystalline sugar mostly dissolving with a strong exothermic reaction and rapid darkening of color, first to amber, then brown to black, followed by rapid formation of a highly porous carbon pillar which expanded well past the top of the beaker. The product was allowed to cool at room temperature for 5 minutes after which it was transferred to a 600 mL beaker containing 300 mL of deionized water. The product was broken up and dispersed in the water using a glass stirring rod to disperse it as a suspended solid in the water. The suspension was suction filtered through a Buchner funnel with Whatman #1 qualitative filter paper. The filtered solids were resuspended in 300 mL of deionized water and suction filtered three more times, resulting in a clear colorless water filtrate by the fourth washing. The solids were then twice suspended in 200 mL of acetone and suction filtered to remove organic impurities. The solids were then transferred to a 600 mL beaker and allowed to dry open to air overnight. Yield of product was 22.310 grams after overnight air drying at room temperature.

Grinding and Sieving of Functionalized Carbon Material to Produce Carbon Micro Powder. The product from above was ground using a mortar and pestle and sieved using a standard 45 micron (325 mesh) polyamide screen sieve to separate and isolate a powder fraction with a particle size distribution with maximum diameters less than 45 microns.

Figure 1:
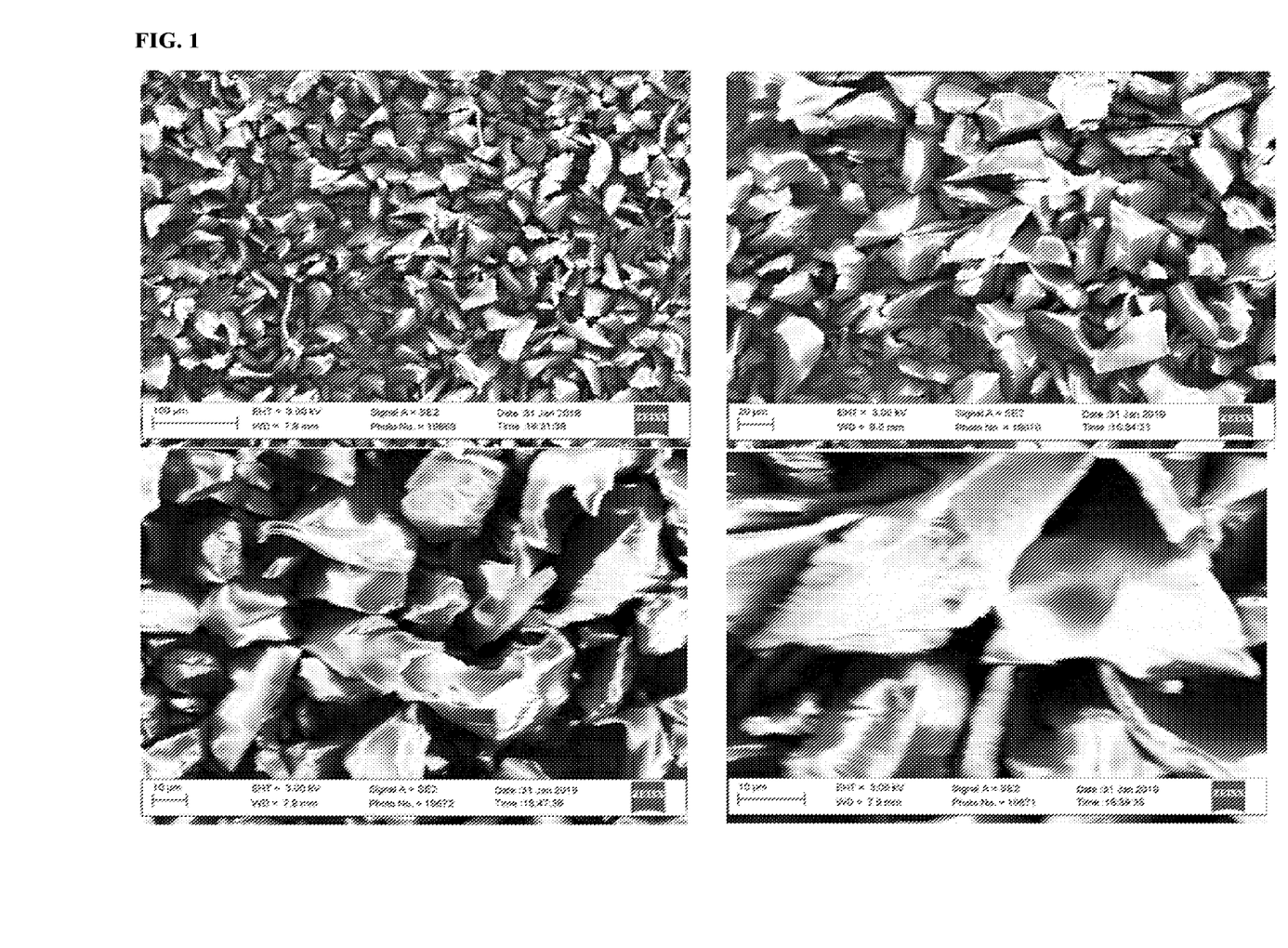
FIG. 1 shows Scanning Electron Micrograph (SEM) images of carbon micro-powder prepared from dehydration of crystalline fructose.

Scanning Electron Microscopy of a Carbon Micro-Powder Derived from Crystalline Fructose. Scanning electron microscopy (SEM) images were obtained using a Zeiss LEO 1550VP scanning electron microscope. FIG. 1 shows SEM images, at four different degrees of magnification, of one of the carbon micro materials of the present invention that was derived from dehydration of crystalline fructose using concentrated sulfuric acid. After grinding to a fine micro-powder, the particle size range shown in the images was isolated by screening through a 45 micron (325 mesh) standard polyamide screen sieve. The particles exhibit a smooth, non-porous surface and a platelet morphology with a low degree of random curvature and maximum diameters of less than 50 microns (consistent with the isolation procedure). The thickness of the platelets varies considerably but is generally 1 to 2 orders of magnitude smaller than the width dimension (i.e. 0.5 to 5 microns) giving them aspect ratios in the range of 10 to 100. There is no evidence of stacking or agglomeration of the particles apparent in the images.

Elemental Analysis of a Carbon Micro-Powder Derived from Crystalline Fructose.

A sample of the carbon micro powder derived from crystalline fructose was dried in an oven (open air atmosphere) at 150° C. until constant weight was achieved. The total weight loss was 28.4%. Elemental analysis of this sample gave the following results: Carbon: 67.11%, Hydrogen: 2.69%, Oxygen: 28.99%, Sulfur: 0.082%

Figure 2:
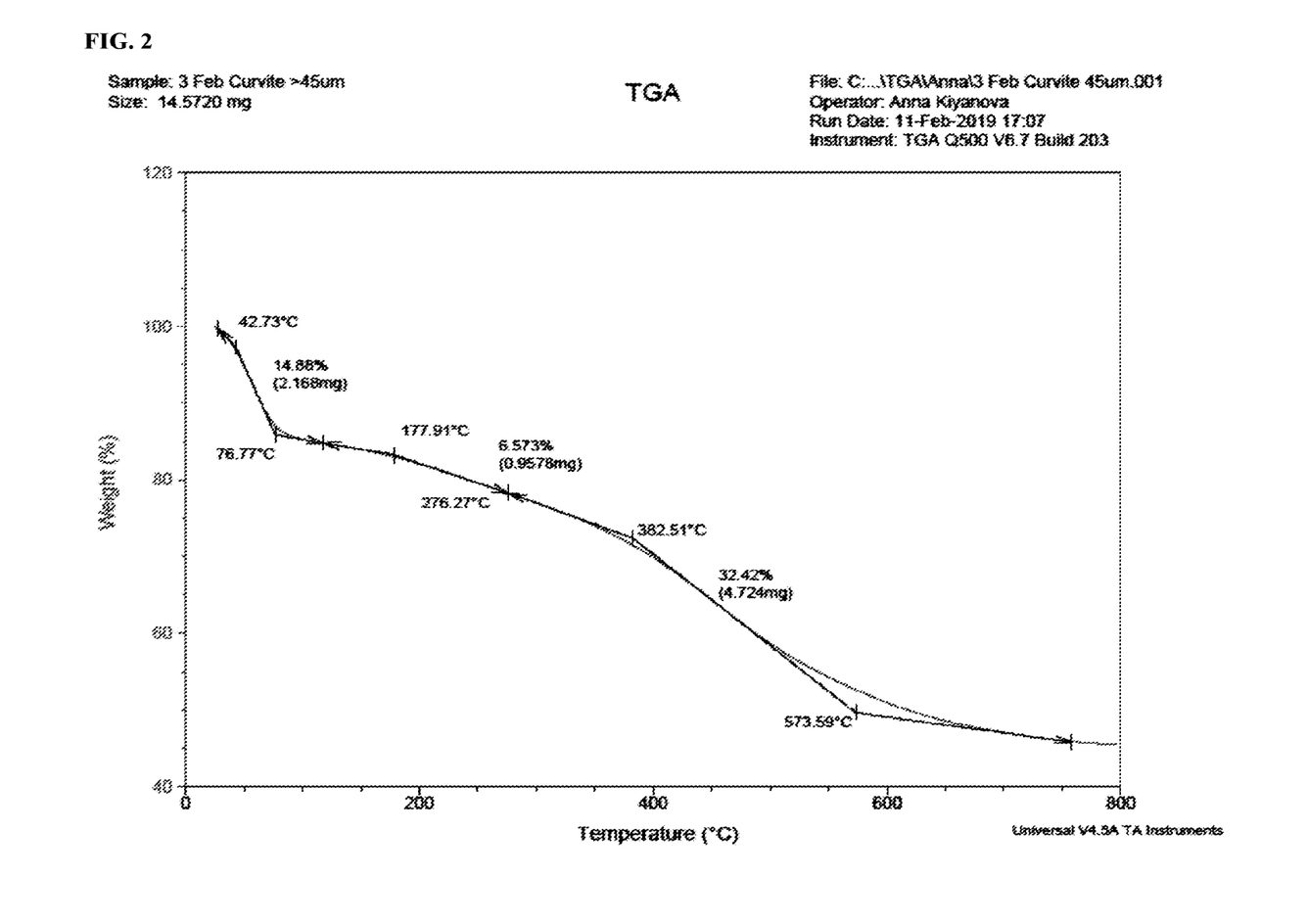
FIG. 2 is a graph of a thermogravimetric analysis of carbon micro-powder prepared from dehydration of crystalline fructose.

Thermogravimetric analysis (TGA) of a Carbon Micro-Powder Prepared from Crystalline Fructose. TGA analysis was carried out under nitrogen atmosphere using a TA Instruments Q500 Thermographic Analyzer. The sample was allowed to air dry at room temperature and was ground to a micro powder prior to running the TGA. TGA of the sample produced the graph shown in FIG. 2 which indicates a total weight loss of 40% from room temperature up to 500° C. Other than the inflection point at ca 77° C. (likely loss of free water) the loss of weight is fairly continuous over the remaining temperature range suggesting that progressive dehydration via elimination reactions involving hydroxyl (alcohol) functional groups is occurring.

Elemental Analysis of Carbon Micro-Powder Derived from Crystalline Fructose and Activated by Heating to 500° C. A sample of the carbon micro-powder derived from crystalline fructose that was dried at 150° C. as described above for the elemental analysis sample, was activated by heating in a furnace (open air atmosphere) from 25° C. to 500° C. at a heating rate of 34° C./min. When the temperature reached 500° C. (14 min) the sample was immediately removed from the furnace and allowed to cool to room temperature. The sample showed a weight loss of 31.7%. Elemental analysis (Galbraith Laboratories, Knoxville, TN) of this sample gave the following results: Carbon: 73.65%, Hydrogen: 2.68%, Oxygen: 22.69%.

Specific Surface Area Analysis (BET method) of Carbon Micro-Powder Derived from Crystalline Fructose and Heat Activated at 500° C. A sample of the carbon micro-powder derived from crystalline fructose was dried in an oven (open air atmosphere) at 150° C. until constant weight was achieved. The coarse powder was then ball milled (dry, 1 cm diameter ceramic balls) for 2.0 hours at 330 rpm resulting in fine micro-powder with maximum particle diameters of about 50 μm. The micro-powder was activated by twice heating to 500° C. at a heating rate of 34° C. per minute, each time discontinuing heating when the sample reached 500° C. and immediately allowing it to cool to room temperature. Total weight loss was 37.7%. Specific surface area analysis of the sample (BET method, Particle Technology Labs, Downer's Grove, IL) showed a surface area of 325.08 m²/g.

X-ray Powder Diffraction (XRD) Analysis of Carbon Micro-Powders Derived from Crystalline Fructose vs Commercial Graphite. XRD analyses were carried out using a Bruker D8 Discover XRD instrument. Two carbon micro-powders of the present invention, prepared as described above for the elemental analysis samples, were analyzed to determine their percent crystallinity. One of the samples was dried to constant weight at 150° C. with no further heat treatment, whereas the other sample was additionally activated by heating to 500° C. XRD analyses showed % crystallinity of 9.2% and 27.7% for the two samples respectively. The results indicate that crystallinity increases significantly as oxygen content is reduced by heat treatment. For comparison, XRD analysis was performed on a commercial graphite powder sample. As expected, the graphite was highly crystalline (95.4%).

Preparation of 20% Carbon/Epoxy Composite Test Samples with Carbon Micro-Powder Derived from Crystalline Fructose. Carbon micro-powder (1.298 g, <45 micron) prepared from crystalline fructose as described above was dispersed in 4.422 grams of epoxy resin (bis phenol A resin) using an IKA T 25 overhead stator-rotor disperser with an S25N-8G (8 mm diameter) micro mixing head operating at 25,000 rpm for a ten-minute mixing time. The mixture was degassed under vacuum until foaming subsided and the surface of the dispersion appeared smooth and free of gas bubbles. Diethylenetriamine hardener (1.0 g) was added and the mixture was gently stirred with a spatula for 5 minutes, then poured into cavity molds to make test bars for dynamic mechanical analysis. The test bars were allowed to cure at room temperature for two days, and then heat cured at 150° C. for 1.0 hour.

Electrical Conductivity Measurements on Carbon/Epoxy Composite Samples Containing 20% and 40% Carbon Micro-Powder Derived from Crystalline Fructose and Heat Activated at 500° C. Resistivity (reciprocal of conductivity) measurements were carried out on 20% and 40% carbon/epoxy test samples prepared from carbon micro powder derived from crystalline fructose and activated at 500° C. The measurements were carried out using a Static Solutions Ohm-Stat RT-1000 system. The 20% and 40% carbon loaded composite samples showed resistivities of 1.23E13 Ohm-cm and 9.81E12 Ohm-cm respectively indicating very low electrical conductivity (i.e. highly insulating).

Figure 3:
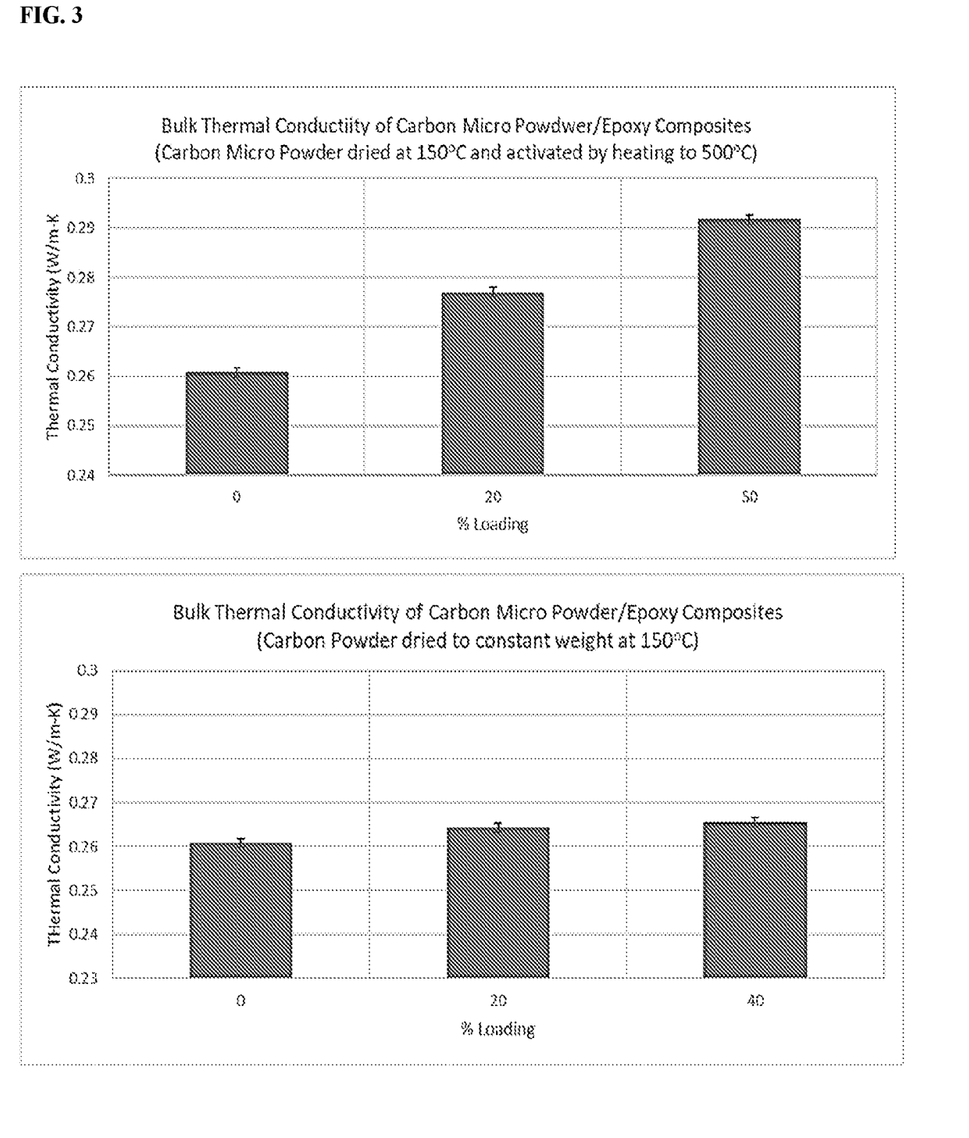
FIG. 3 shows bar charts comparing the bulk thermal conductivity of Epoxy composites containing various levels of carbon micro-powders derived from crystalline fructose wherein the micro-powders have a different heat treatment history.

Thermal Conductivity Measurements on Carbon/Epoxy Composite Samples Containing Carbon Micro-Powders Derived from Crystalline Fructose. Thermal conductivity measurements were carried out by ThermTest Inc., Fredericton, NB, Canada, using a ThermTest TPS 2500 S Analyzer. FIG. 3 shows bar charts comparing the bulk thermal conductivity of Epoxy composites containing various levels of carbon micro-powder derived from crystalline fructose. The upper chart shows data for carbon micro-powder that was dried to constant weight at 150° C. with no further heat activation whereas the lower chart shows data for carbon micro-powder that was dried to constant weight at 150° C. and then further activated by heating to 500° C. The carbon micro-powder that was dried at 150° C. without further heat activation showed a statistically significant but very small enhancement in bulk thermal conductivity vs the epoxy control with no carbon filler (e.g. +0.0035 W/m-K, 1.3% increase vs epoxy control, at 20% loading). In contrast, the carbon micro-powder that was further heat activated by heating to 500° C. showed a much larger enhancement in bulk thermal conductivity vs the epoxy control (e.g. +0.0162 W/m-K, 6.0% increase vs epoxy control, at 20% loading).

Figure 4:
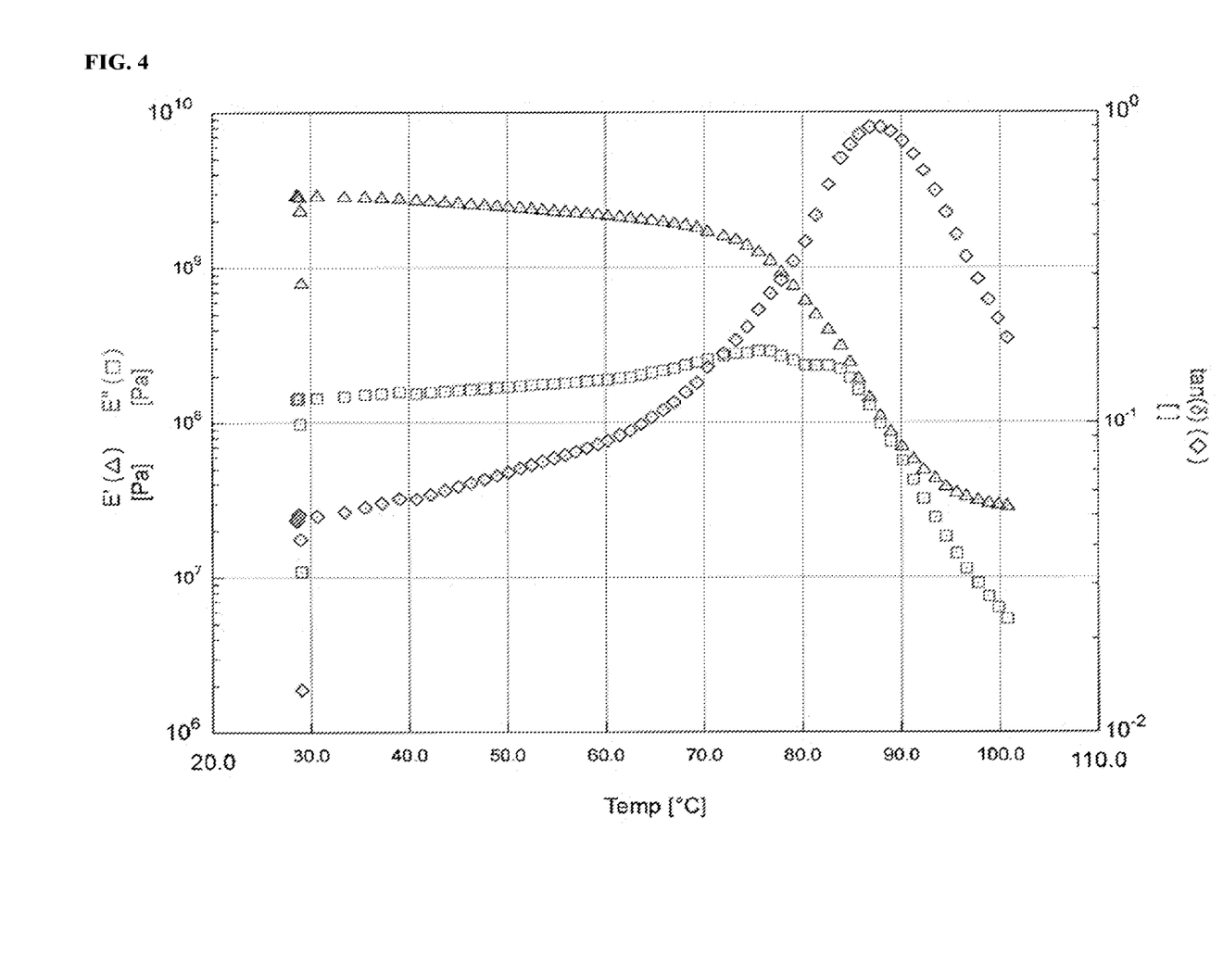
FIG. 4 is a plot showing storage modulus (E'), loss modulus (E") and tan δ as a function of temperature for an epoxy control sample.
Figure 5:
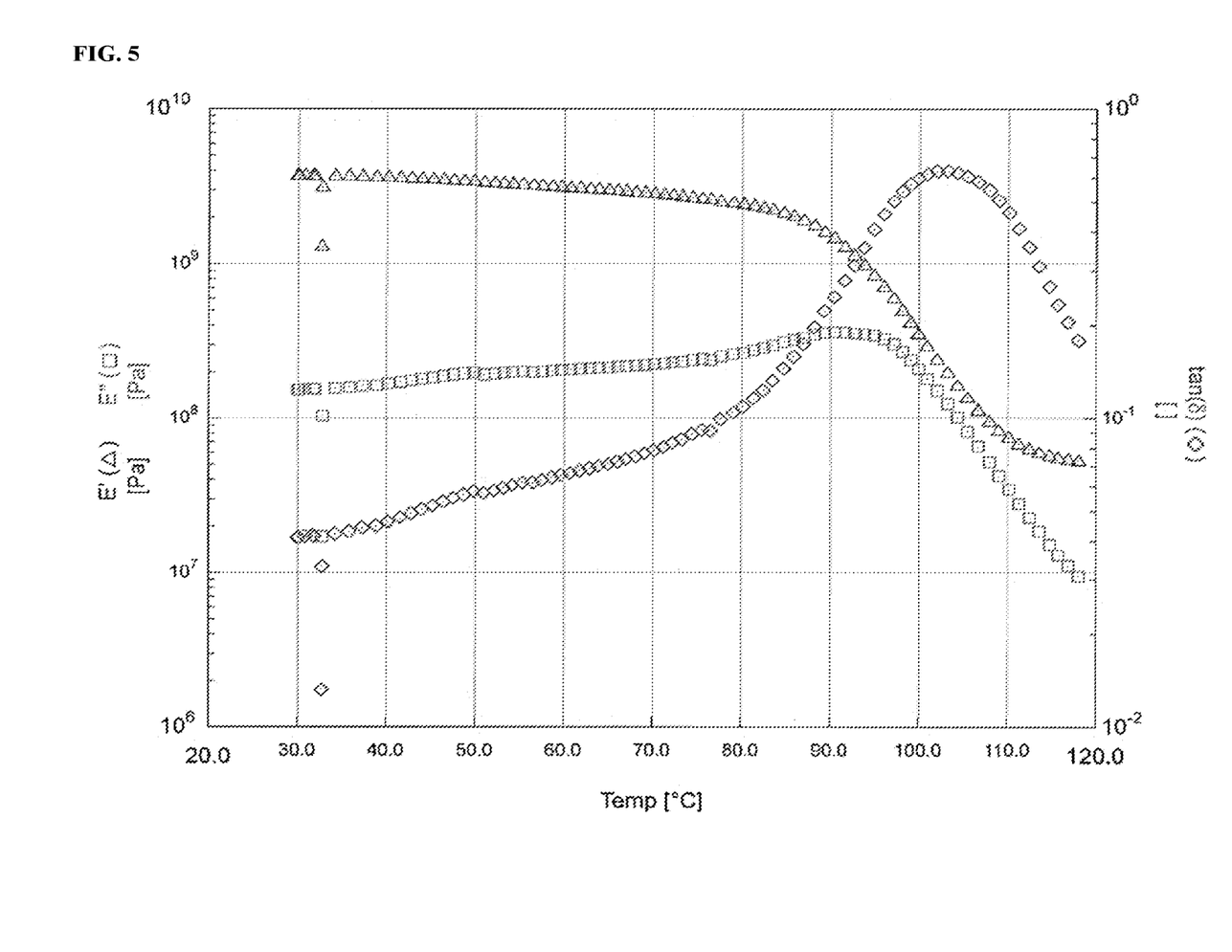
FIG. 5 is a plot showing storage modulus (E'), loss modulus (E") and tan δ as a function of temperature for a 20% carbon/epoxy composite sample.
Figure 6:
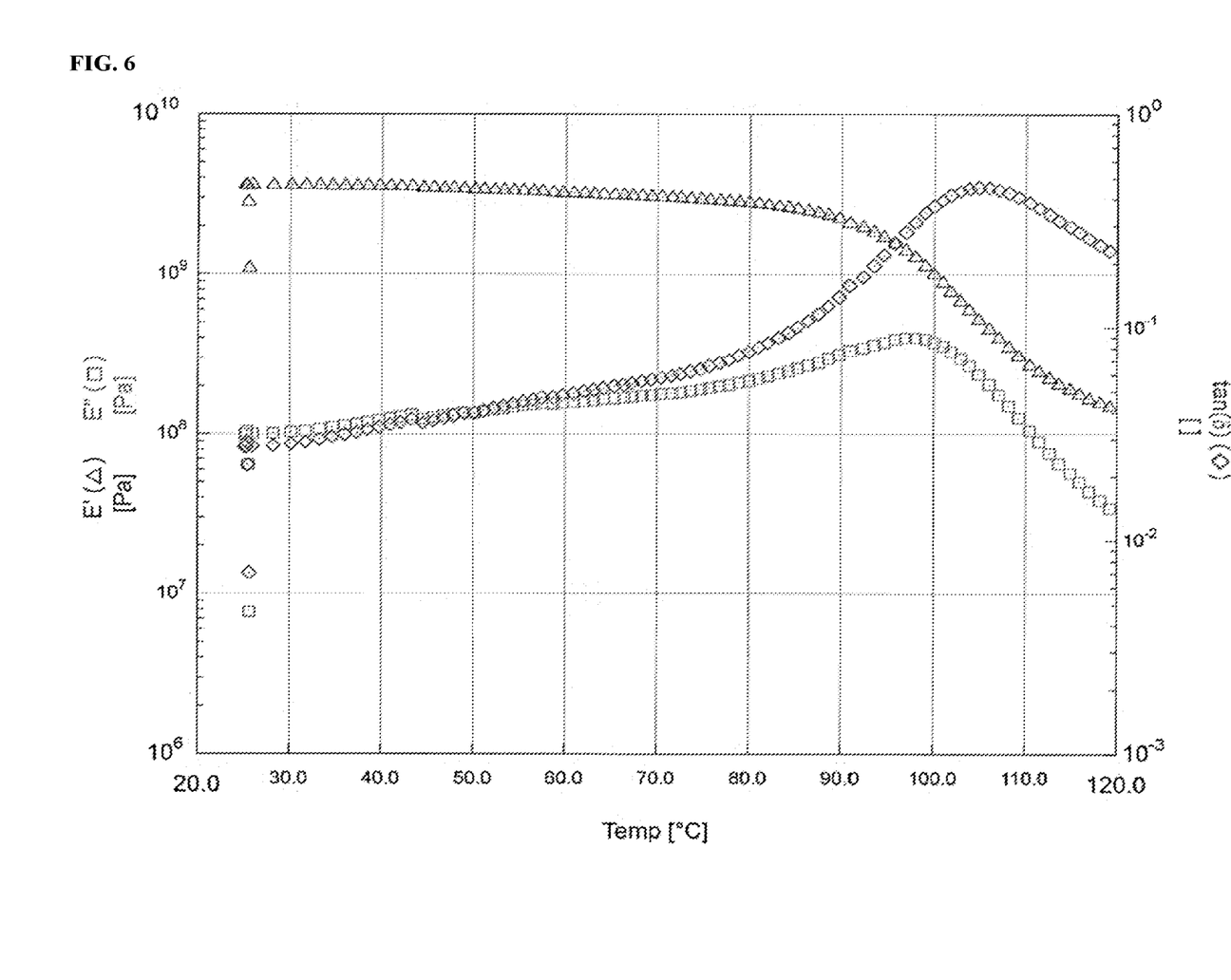
FIG. 6 is a plot showing storage modulus (E'), loss modulus (E") and tan δ as a function of temperature for a 40% carbon/epoxy composite sample.

Dynamic Mechanical Analysis (DMA) of 20% and 40% Carbon/Epoxy Samples. 20% and 40% carbon/epoxy samples along with an epoxy control sample were analyzed by DMA using a TA Instruments RSA III Dynamic Mechanical Analyzer. The analyses were run on test bars with approximate dimensions of 25 mm×10 mm×2 mm in 3-point bending mode as temperature ramp studies at a heating rate of 5° C./min and an oscillation frequency of 1 Hz. FIGS. 4, 5, and 6, show plots of the DMA results for the epoxy control, 20% and 40% carbon/epoxy samples respectively. Each plot shows storage modulus (E'), loss modulus (E") and tan δ as a function of temperature.

FIG. 4, the plot for the epoxy control sample, shows an initial storage modulus at 30° C. of 2.9 GPa which drops gradually with increasing temperature to 1.0 GPa at 78° C. and then rapidly drops lower as the temperature continues to increase. The glass transition temperature (Tg) can be estimated from each of the three parameters E', E", or tan δ as the temperature at which the rate of change of E' (i.e. second derivative) reaches a maximum, or the temperature at which E" reaches maximum value, or the temperature at which tan δ reaches maximum value. The E' and E" estimates both indicate a Tg for the epoxy control of ca 80° C., whereas the maximum in tan δ indicates a Tg of ca 87° C. (Note: it is typical for the estimate from tan δ to be higher.)

FIG. 5, the plot for the 20% carbon/epoxy composite sample, shows an initial storage modulus at 30° C. of 3.9 GPa (i.e. 35% increase vs epoxy control) which drops gradually with increasing temperature to 1.0 GPa at 93° C. (i.e. 15 degrees higher than the corresponding temperature for the epoxy control) and then rapidly drops lower as the temperature continues to increase. The Tg as estimated from E' or E" is ca 95° C. (i.e. 15 degrees higher than the epoxy control) whereas the Tg estimated from tan δ is ca 102° C. (also 15 degrees higher than the epoxy control).

FIG. 6, the plot for the 40% carbon/epoxy composite sample, shows an initial storage modulus at 30° C. of 3.7 GPa (i.e. 28% increase vs epoxy control) which drops gradually with increasing temperature to 1.0 GPa at 100° C. (i.e. 22 degrees higher than the corresponding temperature for the epoxy control) and then rapidly drops lower as the temperature continues to increase. The Tg as estimated from E' or E" is ca 100° C. (i.e. 20 degrees higher than the epoxy control) whereas the Tg estimated from tan δ is ca 105° C. (18 degrees higher than the epoxy control).

Elemental Analysis of Carbon Micro-Powder Derived from Crystalline Fructose and Activated by Heating to 500° C. under a Nitrogen Atmosphere. A sample of the carbon micro-powder derived from crystalline fructose that was dried to constant weight at 150° C. (open air atmosphere as described above) was activated by heating in a furnace under nitrogen atmosphere from 25° C. to 500° C. at a heating rate of ca 30° C./min. When the temperature reached 500° C. (15 min) the temperature was held at 500° C. for 10 additional minutes after which it was allowed to slowly cool back to room temperature under a nitrogen atmosphere. The sample showed a weight loss of 13.4%. Elemental analysis (Galbraith Laboratories, Knoxville, TN) of this sample gave the following results: Carbon: 75.57%, Hydrogen: 2.42%, Oxygen: 19.66%.

Elemental Analysis of Carbon Micro-Powder Derived from Crystalline Fructose and Activated by Heating to 600°

C. under a Nitrogen Atmosphere. A sample of the carbon micro-powder derived from crystalline fructose that was dried to constant weight at 150° C. (open air atmosphere as described above) was activated by heating in a furnace under nitrogen atmosphere from 25° C. to 600° C. at a heating rate of ca 25° C./min. When the temperature reached 600° C. (15 min) the temperature was held at 600° C. for 10 additional minutes after which it was allowed to slowly cool back to room temperature under a nitrogen atmosphere. The sample showed a weight loss of 33.9%. Elemental analysis (Galbraith Laboratories, Knoxville, TN) of this sample gave the following results: Carbon: 86.62%, Hydrogen: 2.55%, Oxygen: 8.81%.

Thermal Conductivity Measurements on Carbon Micro-Powders Derived from Crystalline Fructose. Thermal conductivity measurements were carried out by ThermTest Inc., Fredericton, NB, Canada, using a ThermTest TPS 2500 S Analyzer. Bulk thermal conductivity was measured on two carbon micro powders with different heat treatment histories. The first measurement was made on a carbon micro-powder that was dried to constant weight in open air at 150° C. with no further heat activation, whereas the second measurement was made on a carbon micro-powder that was dried to constant weight in open air at 150° C. and then further activated by heating to 600° C. under a nitrogen atmosphere as described above. The carbon micro-powder that was dried at 150° C. without further heat activation showed a bulk thermal conductivity of 0.1014 W/m-K (average of 5 measurements, standard deviation=0.0002 W/m-K). The carbon micro-powder that was dried at 150° C. and further activated by heating to 600° C. under a nitrogen atmosphere showed a bulk thermal conductivity of 0.1119 W/m-K (average of 5 measurements, standard deviation=0.0002) a 10% increase vs the sample that was not activated at 600° C.

Figure 7:
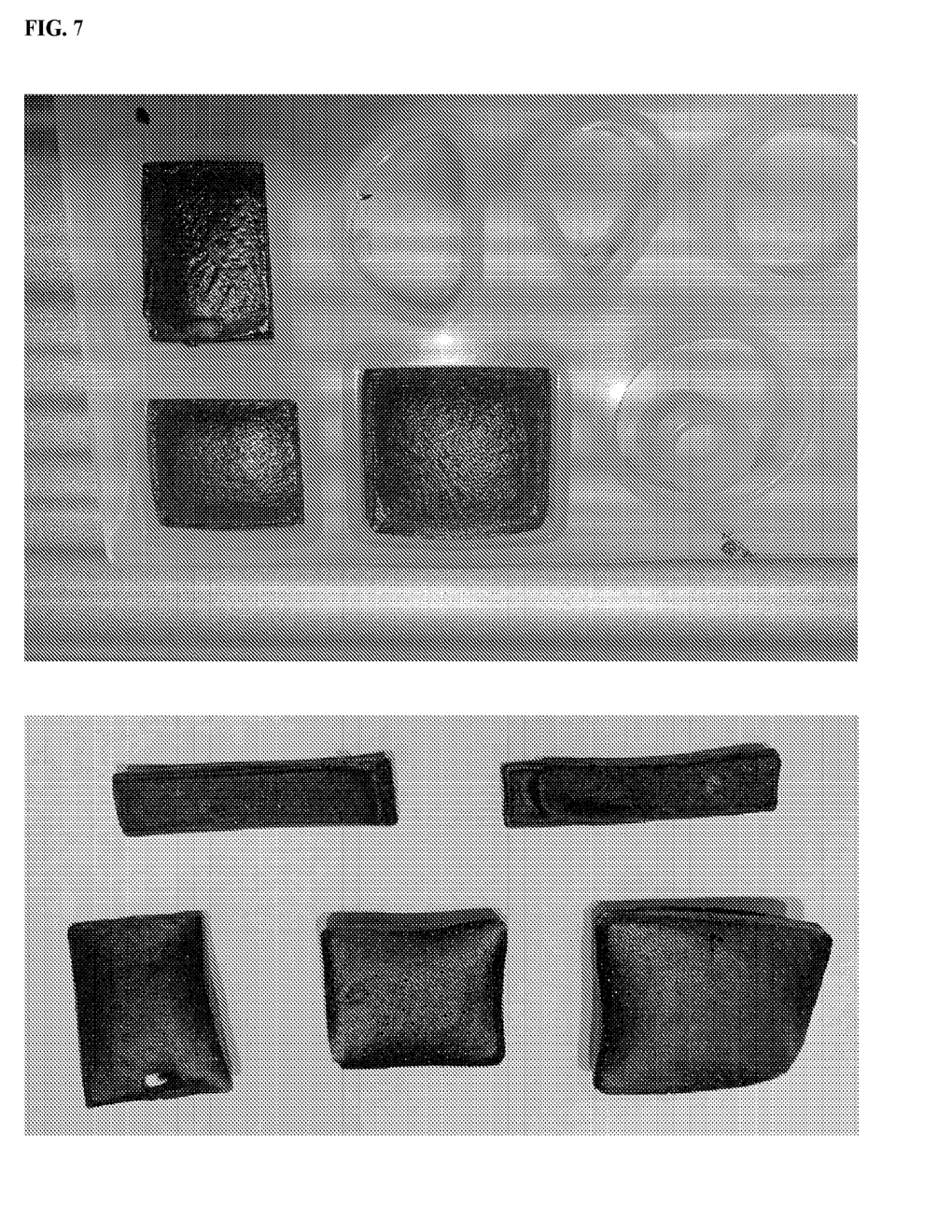
FIG. 7 shows photographs of 30% carbon/poly(vinylchloride) (PVC) composite samples prepared from carbon micro-powder derived from crystalline fructose. Samples are shown in the cavity molds after 3 hours evaporation time, and removed from the molds after 24 hours.

Preparation of 30% Carbon/Poly(vinylchloride) (PVC) Composite Samples with Carbon Micro-Powder Derived from Crystalline Fructose. Carbon micro-powder (1.532 g) prepared from crystalline fructose as described above was dry mixed with PVC powder (3.527 g, Aldrich Lot #13328 TDV) in a mixing vial, stirring with a spatula until uniformly mixed. THF solvent (15 mL, lab reagent grade) was added with stirring resulting in a viscous, but flowable suspension. The mixing vial was cooled in an ice bath and the suspension was blended using an IKA T 25 overhead stator-rotor disperser with an S25N-8G (8 mm diameter) micro mixing head. The mixing RPM was progressively ramped up to 25,000 over a period of 5 minutes after which mixing was continued at 25,000 RPM for an additional 5 minutes. The resultant suspension was poured into cavity molds which were allowed to stand in open air at room temperature to allow the THF to evaporate. After 3 hours, the samples were dry to touch, and were removed from the molds. They had a soft vinyl consistency. After 24 hours, the samples had a firm, but pliable consistency and continued to harden as the residual THF evaporated. FIG. 7 shows photos of the samples in the cavity molds after 3 hours and removed from the molds after 24 hours.

REFERENCES

1. "Graphite" *Wikipedia*
2. Jui, G.; Wilhelm, H.; L'Heureux, J. L.; "High Purity Graphite Powders for High Performance", Technical Bulletin, Timcal Graphite and Carbon, Timcal Ltd.
3. "Carbon Black", *Wikipedia*
4. "Carbon Additives for Polymer Compounds", Technical Bulletin, Timcal Graphite and Carbon, Timcal Ltd.
5. "Carbon Powders for Lithium Ion Battery Systems" Technical Bulletin, TImcal Graphite and Carbon, Timcal Ltd.
6. Manocha, S. M.; "Porous Carbons", Sadhana: Academy Proceedings in Engineering and Sciences, 28, 335, 2003
7. Harris, P. J. F.; "New Perspectives on the Structure of Graphitic Carbons", *Critical Reviews in Solid State and Materials Sciences*, 30, 255, 2005
8. Harris, P. J. F.; "Imaging the Atomic Structure of Activated Carbon", *J. Phys.: Condens. Matter*, 20, 362201, 2008
9. Smith, M. A.; Foley, H. C.; Lobo, R. F.; "A Simple Model Describes the PDF of a Non-graphatizing Carbon", Carbon, 42, 241, 2004
10. Li, Y.; Inam; F.; Kumar, A.; Thorp, M. F.; Drabold, D. A.; "Pentagonal Puckering in a Sheet of Amorphous Graphene", *Phys. Status Solidi B*, 9, 2082, 2011
11. Marriott, A. S.; Hunt, A. J.; Bergstrom, E.; Wilson, K.; Budarin, W. L.; Thomas-Oates, J.; Clark, J. H.; Frydson, R.; "Investigating the Structure of Biomass-derived Non-graphatizing Mesoporous Carbons by Electron Energy Loss Spectroscopy in the Transmission Electron Microscope and X-ray Photoelectron Spectroscopy", Carbon, 67, 514, 2014
12. Yu, J.; Yoon, S. B.; Chai, G. S.; "Ordered Uniform Porous Carbon by Carbonization of Sugars", *Carbon*, 39, 1421, 2001
13. Harmas, M; Thomberg, T.; Romann, T.; Janes, A.; Lust, E.; "Carbon for Energy Storage Derived from Granulated White Sugar by Hydrothermal Carbonization and Subsequent Zinc Chloride Activation", *J. Electrochem. Soc.*, 164, A1866, 2017
14. Fechler, N.; Wohlgemuth, S.; Jaker, P.; Antonietti, M.; "Salt and Sugar: Direct Synthesis of High Surface Area Carbon Materials at Low Temperatures via Hydrothermal Carbonization of Glucose under Hypersaline Conditions", *J. Mater. Chem. A*, 1, 9418, 2013
15. Whitener, K; "Rapid Synthesis of Thin Amorphous Carbon Films by Sugar Dehydration and Dispersion", *AIMS Material Science*, 3(4), 1309, 2016
16. Morimoto, N.; Kubo, T.; Nishina, Y.; "Tailoring the Oxygen Content of Graphite and Reduced Graphene Oxide for Specific Applications", Scientific Reports, 6, 21715, 2016
17. Zhou, T.; Liu, F.; Suganuma, K.; Nagao, S.; "Use of Graphene Oxide in Achieving High Overall Thermal Properties of Polymer for Printed Electronics", *RSC Adv.*, 6, 20621, 2016
18. Park, W.; Hu, J.; Jauregui, L. A.; Ruan, X.; Chen, Y. P.; Electrical and Thermal Conductivities of Reduced Graphene Oxide/Polystyrene Composites"
19. Liao, K.; Aoyama, S.; Abdala, A. A.; Macosko, C.; "Does Graphene Change Tg of Nanocomposites?", *Macromolecules*, 47, 8311, 2014

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims. FIG. 7 shows a photo of the samples after 24 hours.

The invention claimed is:

1. A polymer composite comprising a carbon micro-powder characterized in having three or more of the following properties:
   a) a carbon content of from 65 to 95% and an oxygen content of 35 to 5% on a weight basis;
   b) a specific surface area of less than 500 m²/g;
   c) percent crystallinity of 5% to 75%;
   d) the particles have a platelet morphology with aspect ratios greater than 5:1;
   e) the particles have significant curvature such that they are not planar; and
   f) the particles have a smooth, non-porous appearance at 1,000× magnification by SEM
   and a thermosetting or thermoplastic polymer, wherein the bulk thermal conductivity of the composite is greater than 0.27 W/m-K, and the electrical resistivity of the composite is greater than 1.0E10 Ohm-cm.

2. The polymer composite of claim 1 wherein the composite comprises from 1% to 60% carbon micro-powder.

3. The polymer composite of claim 1 wherein the thermosetting resin is an epoxy resin, an unsaturated polyester resin, a polyurethane resin, a cyanoacrylate resin or a silicone resin.

4. The polymer composite of claim 1 wherein the thermosetting polymer is initially a liquid resin and the carbon micro-powder is dispersed into the liquid resin prior to curing (hardening) the resin.

5. The polymer composite of claim 1 wherein the thermoplastic polymer is polyethylene, polypropylene, poly(vinyl chloride), poly(ethylene terephthalate) polycarbonate, polystyrene, polyamide, poly(methylmethacrylate) or polyacrylonitrile.

6. The polymer composite of claim 1, wherein the carbon micro-powder has four or more properties a)-f).

7. The polymer composite of claim 1, wherein the carbon micro-powder has five or more properties a)-f).

8. The polymer composite of claim 1, wherein the carbon micro-powder has properties a)-f).

* * * * *